US008633834B2

(12) United States Patent
Lee et al.

(10) Patent No.: US 8,633,834 B2
(45) Date of Patent: Jan. 21, 2014

(54) ALARM APPARATUS AND ALARMING METHOD

(75) Inventors: Hou-Hsien Lee, Tu-Cheng (TW); Chang-Jung Lee, Tu-Cheng (TW); Chih-Ping Lo, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 433 days.

(21) Appl. No.: 12/850,648

(22) Filed: Aug. 5, 2010

(65) Prior Publication Data

US 2011/0267203 A1 Nov. 3, 2011

(30) Foreign Application Priority Data

Apr. 30, 2010 (TW) ................................ 99113799 A

(51) Int. Cl.
*B60Q 1/26* (2006.01)
*B60Q 1/52* (2006.01)

(52) U.S. Cl.
USPC ........... 340/928; 340/468; 340/469; 340/470; 340/471

(58) Field of Classification Search
USPC .......................... 340/928, 468, 469, 470, 471
See application file for complete search history.

(56) References Cited

U.S. PATENT DOCUMENTS

| | | | | |
|---|---|---|---|---|
| 5,253,150 | A * | 10/1993 | Vanni | 362/183 |
| 6,264,334 | B1 * | 7/2001 | Kushida | 359/515 |
| 6,367,936 | B2 * | 4/2002 | Kushida | 359/515 |
| 6,420,977 | B1 * | 7/2002 | Corbitt et al. | 340/937 |
| 7,044,616 | B2 * | 5/2006 | Shih | 362/135 |
| 2006/0072788 | A1 * | 4/2006 | Suzuki et al. | 382/103 |
| 2007/0268685 | A1 * | 11/2007 | Fossier et al. | 362/135 |
| 2008/0094249 | A1 * | 4/2008 | Pappas et al. | 340/906 |
| 2008/0284615 | A1 * | 11/2008 | Tauchi et al. | 340/905 |
| 2010/0185411 | A1 * | 7/2010 | Pfeiffer et al. | 702/150 |
| 2010/0195871 | A1 * | 8/2010 | Simon | 382/105 |
| 2010/0214113 | A1 * | 8/2010 | Chang | 340/815.45 |
| 2010/0315214 | A1 * | 12/2010 | Yano et al. | 340/435 |
| 2011/0006915 | A1 * | 1/2011 | Sower | 340/907 |

FOREIGN PATENT DOCUMENTS

| | | |
|---|---|---|
| CN | 101388145 A | 3/2009 |
| CN | 201334646 Y | 10/2009 |
| CN | 101572004 A | 11/2009 |

* cited by examiner

*Primary Examiner* — George Bugg
*Assistant Examiner* — Munear Akki
(74) *Attorney, Agent, or Firm* — Altis Law Group, Inc.

(57) ABSTRACT

An alarm apparatus includes a first camera facing a first direction of a road, a second camera facing a second direction of the road, a first output device facing the first direction of the road, a second output device facing the second direction of the road, a processor, and a storage unit including a detecting module and a controlling module. The detecting module stores a first instruction executed by the processor, thereby the processor receives the images captured by the first and the second cameras and determines what is the state of the road condition. The controlling module stores a second instruction executed by the processor, thereby the processor controls the first and the second output devices to send out appropriate alarming signals.

11 Claims, 4 Drawing Sheets

ALARM APPARATUS AND ALARMING METHOD

BACKGROUND

1. Technical Field

The present disclosure relates to an alarm apparatus and an alarming method.

2. Description of Related Art

For road with blind curves, a convex mirror is usually located at a point so that traffic in one direction can observe traffic coming from the other direction or vice versa. However, if drivers or the pedestrians do not pay attention to the images shown by the convex mirror, traffic accidents may happen. Therefore, there is room for improvement in the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
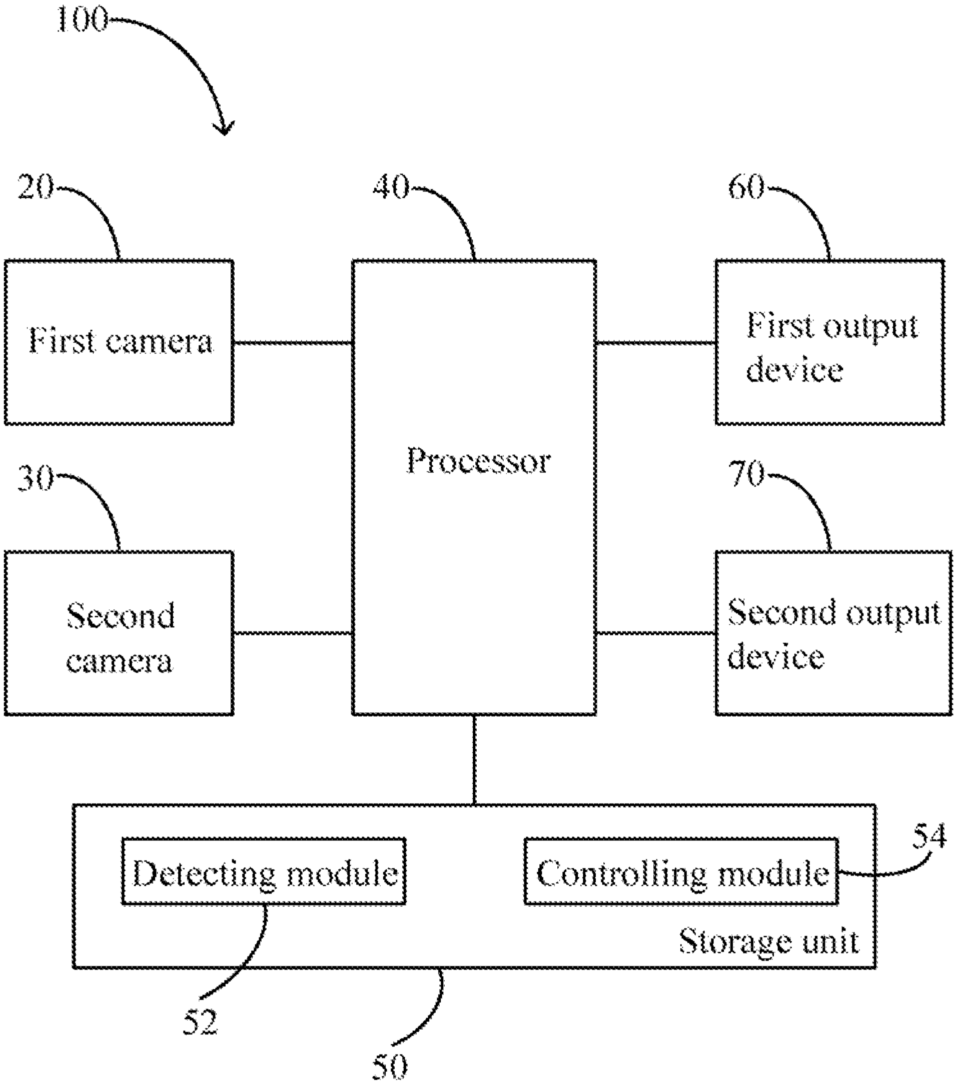
FIG. 1 is a schematic block diagram of an exemplary embodiment of an alarm apparatus.
Figure 2:
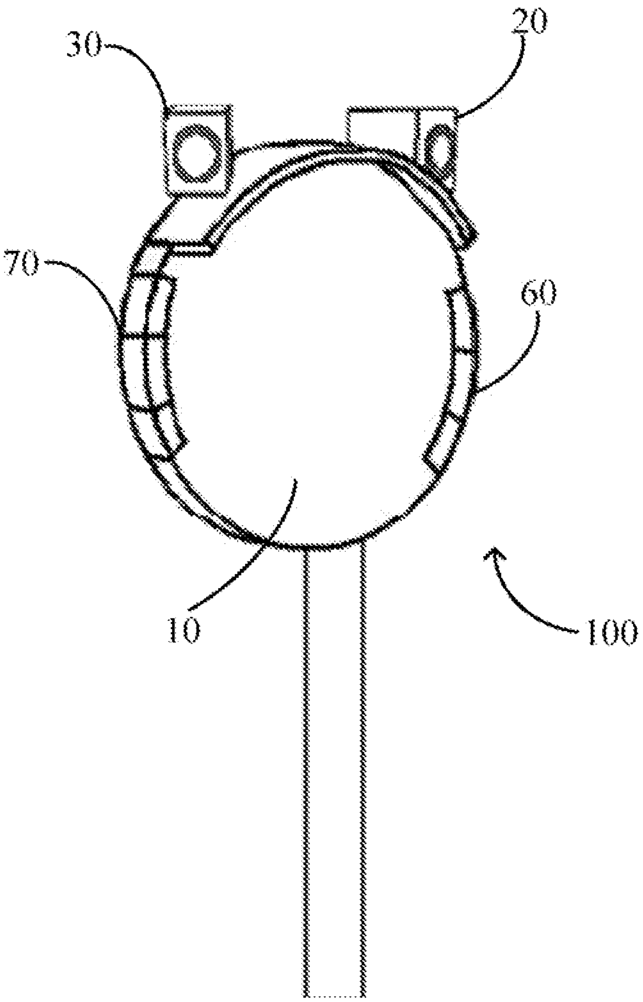
FIG. 2 is an isometric view of the alarm apparatus of FIG. 1.

Referring to FIG. 1 and FIG. 2, an exemplary embodiment of an alarm apparatus 100 includes a round convex mirror 10, a first camera 20, a second camera 30, a processor 40, a storage unit 50, a first output device 60, and a second output device 70.

The convex mirror 10 is fixed at a blind curve of a road. The convex mirror 10 displays images of both directions of the blind curve.

The first camera 20 is mounted on the convex mirror 10 and faces a first direction of the blind curve. The second camera 30 is mounted on the convex mirror 10 and faces a second direction of the blind curve. The first and the second cameras 20 and 30 capture images of both directions of the blind curve.

The processor 40 is connected to the first camera 20, the second camera 30, the storage unit 50, the first output device 60, and the second output device 70.

The first output device 60 is mounted on the convex mirror 10 and faces the first direction of the blind curve. The second output device 70 is mounted on the convex mirror 10 and faces the second direction of the blind curve. The first and the second output devices 60 and 70 send out different alarming signals. In the embodiment, the first and the second output devices 60 and 70 can emit deep yellow, pale yellow, and green light. In other embodiments, the first and the second output devices 60 and 70 can sound a warning.

The storage unit 50 includes a detecting module 52 and a controlling module 54.

The detecting module 52 stores a first instruction executed by the processor 40, thereby the processor 40 receives the images captured by the first and the second cameras 20 and 30 and determines what is the state of the road condition. The road condition has three degrees: first degree, second degree, and third degree. If there are more than a predetermined number of vehicles, pedestrians, or road-blocks on the road, the processor 40 determines the road condition is in the first degree. If there is are fewer number of vehicles and/or pedestrians than the predetermined number on the road, the processor 40 determines the road condition is in the second degree. If there is no vehicle, pedestrian, or road-block on the road, the processor 40 determines the road condition is in the third degree.

The controlling module 54 stores a second instruction executed by the processor 40, thereby the processor 40 controls the first and the second output devices 60 and 70 to send out different alarming signals.

Figure 3:
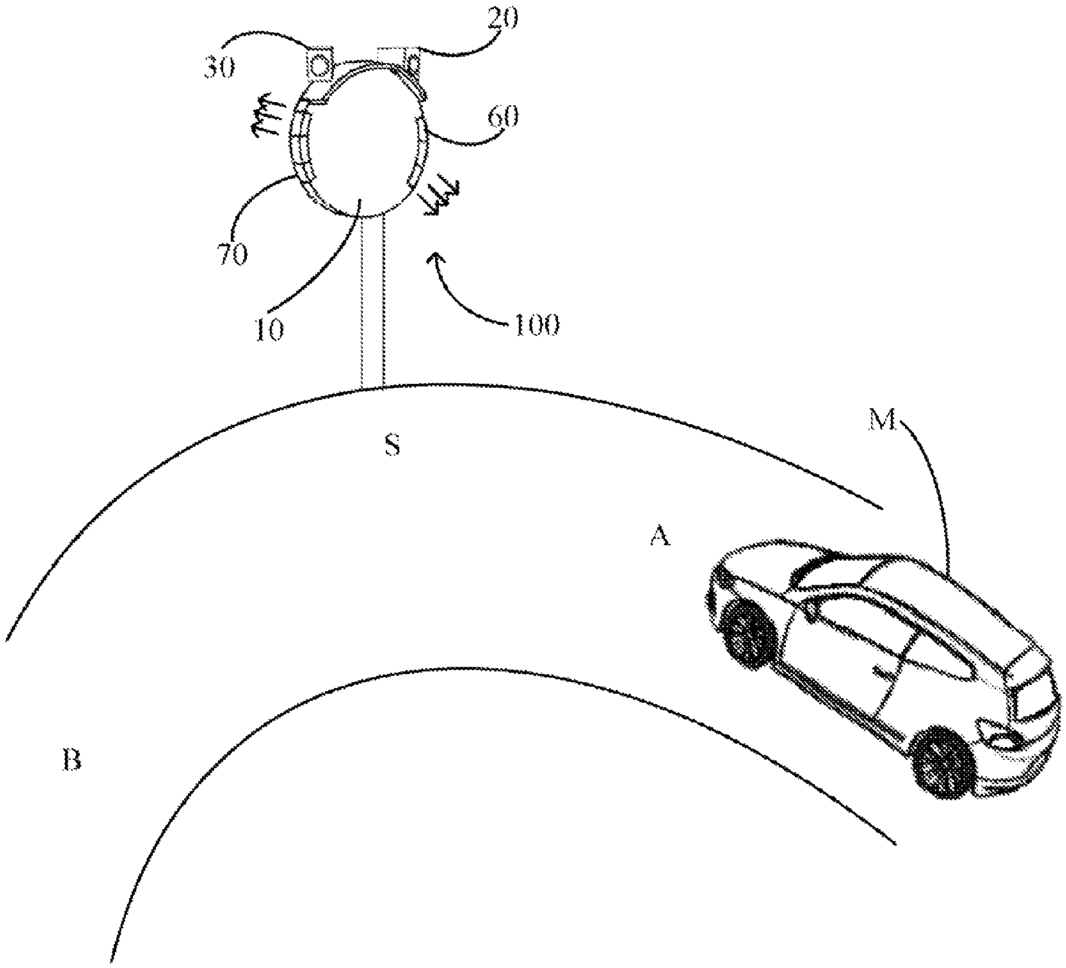
FIG. 3 is a schematic diagram of the alarm apparatus of FIG. 2 located at a blind curve of a road.

Referring to FIG. 3, the road includes a first direction A and a second direction B. The first direction A is connected to the second direction B at a blind curve S of the road. The alarm apparatus 100 is fixed at the blind curve S. The first camera 20 and the first output device 60 face the first direction A of the road. The second camera 30 and the second output device 70 face the second direction B of the road.

The first camera 20 captures images of the first direction A. The second camera 30 captures images of the second direction B.

When there is a vehicle M driving towards the blind curve S on the first direction A and there is no vehicle, pedestrian, or road-block on the second direction B, the processor 40 determines that the first direction A is in the first degree and the second direction B is in the third degree. The processor 40 controls the first output device 60 to emit green light and controls the second output device 70 to emit deep yellow light.

Figure 4:
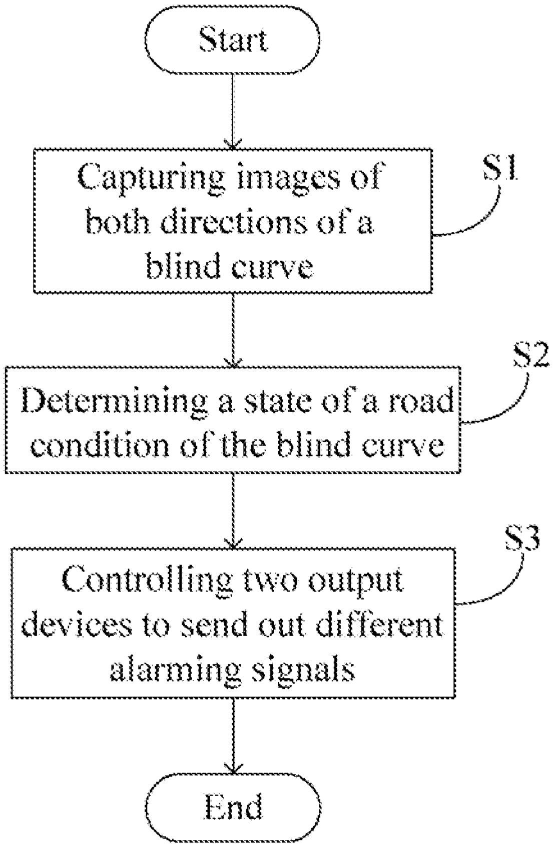
FIG. 4 is a flow chart of an exemplary embodiment of an alarming method.

Referring to FIG. 4, an exemplary embodiment of an alarming method includes the following steps.

In step S1, the first and the second cameras 20 and 30 capture images of both directions of a blind curve.

In step S2, the processor 40 receives the images captured by the first and the second cameras 20 and 30 and determines a state of a road condition of the blind curve.

In step S3, the processor 40 controls the first and the second output devices 60 and 70 to send out appropriate alarming signals.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. An alarm apparatus, comprising:

a first camera facing a first direction of a road, to capture images of the first direction;

a second camera facing a second direction of the road, to capture images of the second direction, wherein a blind curve at which the alarm apparatus is fixed is connected between the first direction and the second direction of the road;

a first output device facing the first direction of the road;

a second output device facing the second direction of the road;

a processor connected to the first camera, the second camera, the first output device, and the second output device; and a storage unit comprising a detecting module and a controlling module, wherein the detecting module stores a first instruction executed by the processor, thereby the processor receives the images captured by the first and the second cameras and determines what is the state of the road condition, the road condition includes three degrees, the processor determines the road condition is in a first one of the three degrees if there are more than a predetermined number of vehicles, pedestrians, or road-blocks on the road, the processor determines the road condition is in a second one of the three degrees if there is are fewer number of vehicles or pedestrians than the predetermined number on the road, and the processor determines the road condition is in a third one of the three degrees if there is no vehicle, pedestrian, or road-block on the road, and the controlling module stores a second instruction executed by the processor, thereby the processor controls the first and the second output devices to send out different alarming signals according to the state of the road condition.

2. The alarm apparatus of claim 1, further comprising a convex mirror to display images of the first direction and the second direction.

3. The alarm apparatus of claim 1, wherein the first and the second output devices emit deep yellow, pale yellow, or green light, according to the road condition.

4. An alarming method, comprising:

determining a state of a road condition of a blind curve according to images captured by two cameras of an alarm apparatus, wherein the blind curve is connected between a first direction and a second direction of the road, and the alarm apparatus is fixed at the blind curve, and wherein the road condition includes three degrees, the road condition is determined in a first one of the three degrees if there are more than a predetermined number of vehicles, pedestrians, or road-blocks on the road, the road condition is determined in a second one of the three degrees if there is are fewer number of vehicles or pedestrians than the predetermined number on the road, and the road condition is determined in a third one of the three degrees if there is no vehicle, pedestrian, or road-block on the road; and controlling two output devices of the alarm apparatus to send out different alarming signals according to the state of the road condition, wherein one of the two output devices faces the first direction of the road, and the other one of the two output devices faces the second direction of the road.

5. The alarming method of claim 4, wherein the two output devices emit deep yellow, pale yellow, or green light according to the road condition.

6. The alarm apparatus of claim 2, wherein the first camera and the second camera are mounted on the convex mirror.

7. The alarm apparatus of claim 2, wherein the first output device and the second output device are mounted on the convex mirror.

8. The alarm apparatus of claim 1, wherein the processor controls the first output device to send out a first one of the alarming signals according to the state of the second direction of the road condition, and controls the second output device to send out a second one of the alarming signals according to the state of the first direction of the road condition.

9. The alarm apparatus of claim 1, wherein the processor controls the first output device to send out a first alarming signal according to the state of the road condition determined through the images captured by the second camera, and the processor controls the second output device to send out a second alarming signal according to the state of the road condition determined by the images captured by the first camera.

10. An alarm apparatus, comprising:

a camera facing a first direction of a road, to capture images of the first direction;

an output device facing a second direction of the road, wherein a blind curve at which the alarm apparatus is fixed is connected between the first direction and the second direction of the road;

a processor connected to the camera and the output device, wherein the processor receives the images captured by the camera, and controls the output device to send out an alarming signal according to a state of a road condition determined through the images captured by the camera, wherein the road condition includes a plurality of degrees, the processor determines the road condition is in a first one of the degrees if there are more than a predetermined number of vehicles, pedestrians, or road-blocks on the road, and the processor determines the road condition is in a second one of the degrees if there is are fewer number of vehicles or pedestrians than the predetermined number on the road.

11. The method of claim 4, wherein the one of the two output devices sends out a first alarming signal according to the images captured by one of the two cameras facing the second direction of the road, and the other one of the two output devices sends out a second alarming signal according to the images captured by the other one of the two cameras facing the first direction of the road.

* * * * *